United States Patent [19]

Horn et al.

[11] 4,105,750
[45] Aug. 8, 1978

[54] PRODUCTION OF CARBON BLACKS

[75] Inventors: John H. Horn, Vizcaya, Spain; William R. Morehead; Ronald C. Hurst, both of Pampa, Tex.; Dennis J. Potter, Milford, Mass.; Clyde D. Schaub, Tulsa, Okla.

[73] Assignee: Cabot Corporation, Boston, Mass.

[21] Appl. No.: 743,963

[22] Filed: Nov. 22, 1976

Related U.S. Application Data

[63] Continuation-in-part of Ser. No. 696,771, Jun. 16, 1976, abandoned.

[51] Int. Cl.$^2$ .................. C01B 31/02; C09C 1/48; C09C 1/56
[52] U.S. Cl. .................. 423/456; 423/450; 423/455
[58] Field of Search .............. 423/449, 450, 455, 456, 423/457; 23/259.5

[56] References Cited

U.S. PATENT DOCUMENTS

| 3,235,334 | 2/1966 | Kelmers | 423/456 |
| 3,563,706 | 2/1971 | Gunnell | 423/456 |
| 3,761,577 | 9/1973 | Dahmen et al. | 423/450 |
| 3,952,087 | 4/1976 | Antonsen et al. | 423/455 |

Primary Examiner—O. R. Vertiz
Assistant Examiner—Gregory A. Heller
Attorney, Agent, or Firm—Jack Schuman; Lawrence A. Chaletsky; Barry R. Blaker

[57] ABSTRACT

This disclosure relates to an improved furnace process for preparing carbon blacks, especially semi-reinforcing furnace blacks, by the incomplete combustion of hydrocarbonaceous feedstocks wherein the structure characteristics of the resultant blacks are lowered without significantly increasing the particle size of the blacks.

10 Claims, No Drawings

PRODUCTION OF CARBON BLACKS

This application is a continuation-in-part of U.S. application Ser. No. 696,771, filed June 16, 1976, and now abandoned.

This invention relates to the production of furnace blacks having many important applications such as fillers, pigments and the like. Most desirably, the process of the present invention produces semi-reinforcing grades of blacks that are widely used as tire carcass blacks. In general, the furnace process for preparing these carbon blacks entails the cracking and/or incomplete combustion of a liquid hydrocarbon feedstock such as cycle stock in an enclosed conversion zone at temperatures above 1800° F to produce carbon black. The carbon black entrained in the gases emanating from the conversion zone is then cooled and collected by any suitable means conventionally used in the art. It has, however, been difficult to increase the throughput of the existing commercial process for producing lower structure blacks such as the semi-reinforcing grades of carbon blacks without altering the essential characteristics of the blacks. Moreover, in the presently practiced commercial process for preparing semi-reinforcing blacks, there is occasionally a problem of the carbon black product containing coke balls.

Accordingly, it is a primary object of this invention to provide a novel and improved process for preparing carbon blacks which exhibit lower structure characteristics than those produced by the process of this invention in the absence of the improvement without significantly increasing the particle size of the blacks.

A further object of this invention is to provide an improved process for producing tire carcass blacks.

Other and different objects, advantages and features of the present invention will become apparent to those skilled in the art upon consideration of the following detailed description and claims.

In accordance with this invention, it has been found that the above and still further objects are achieved by adding a certain portion of the oxidant, such as air and the like, normally required for carrying out the reaction to form the desired carbon black at a location downstream of the point where the hydrocarbon feedstock is introduced. The introduction in the present process of a portion of the required oxidant after the feedstock has been injected causes the structure of the resulting blacks to be lowered but does not significantly increase the particle size of the blacks, and may, if at all, reduce the particle size. More particularly, the amount of oxidant introduced downstream of the make injection ranges from about 5 to about 45% of the total amount of oxidant required for converting the feedstock into the desired carbon black products. Furthermore, the manner of injecting the downstream portion of oxidant into the resultant carbon black-containing stream is not critical. For example, the oxidant may be introduced peripherally, longitudinally or tangentially. In a preferred embodiment of the present invention, the downstream addition of oxidant is accomplished tangentially. As a result of the downstream injection of the oxidant, it has been found that, in addition to reducing the structure of the carbon blacks, the problems of coke and coke ball contamination accompanying production of semi-reinforcing blacks on conventional reactors have been alleviated and the yield and carbon efficiency of the process is from 6 to 10% higher than the conventional process.

The term "structure" as used herein relative to carbon blacks defines a primary property of carbon black which is not influenced consistently by any propery or combination of properties. In general, the term is used in the art to designate the extent of aggregation of the primary particles of a black. Since all blacks manifest some degree of aggregation of the primary particles, a particular black is classified as being a low, normal or high structure black depending upon the relative degree of aggregation manifested thereby. Delineation between the classifications of low, normal or high structure are generally not well defined. Conventionally, the structure of the black is considered to be high when there is a strong tendency for the particles to form chains of particles. On the other hand, the structure of the black is considered to be low when there is a slight tendency to form agglomerates of primary particles. For purposes of determining the structure of blacks there is used herein an oil absorption technique employing dibutyl phthalate. This technique, which is carried out in accordance with ASTM D-2414-72, is more completely described hereinafter.

While direct measurement of the structure characteristics of carbon blacks is possible, it has been demonstrated that an equally reliable, and more convenient, method for determining structure characteristics of blacks which is accepted by the art and is designated as ASTM Test Method D-2414-72 entitled "Dibutyl Phthalate Absorption Number of Carbon Black". In brief, the test procedure entails adding dibutyl phthalate (DBP) to a sample of carbon black, in fluffy or pelleted form, in a Brabender-Cabot Absorptometer, made and sold by C. W. Brabender Instruments, Inc., South Hackensack, New Jersey, and measuring the volume of dibutyl phthalate used. The value is expressed in cubic centimeters or milliliters of dibutyl phthalate (DBP) per 100 grams of carbon black. At present, the art has recognized a well established relationship involving the structure characteristics of a black and the resulting properties of rubber compositions compounded with the particular blacks. The relationship has been described as one involving the degree of structure of a black and the modulus property of a rubber composition compounded with the particular black. In this case, it is generally accepted that, everything else being essentially equivalent, the use of high structure blacks results in the preparation of rubber compositions having high modulus levels while the use of low structure blacks results in the preparation of compounded rubber compositions having low modulus values. Accordingly, in view of the stated objects of the present invention to provide an improved process for preparing furnace blacks having significantly lower structure levels, it has been observed that the above-mentioned relationships are correct. Indeed, while producing blacks of significantly lower structure levels, it has been shown that the incorporation of such blacks in natural and synthetic rubber compositions yields rubber compounds having lowered modulus values.

In practicing the present invention, which is particularly suitable for producing semi-reinforcing grades of carbon black such as those having iodine adsorption numbers (as determined in accordance with ASTM D-1510-70) ranging from about 28 to about 75, the following operation is observed. A carbon black-yielding liquid feedstock is injected substantially transversely into a pre-formed stream of hot combustion gases flowing in a downstream direction at an average linear velocity of at least 500 feet per second. The feedstock is injected transversely into the combustion gases from the periphery of the stream to a degree sufficient to achieve penetration so as to avoid coke formation on the walls of the carbon forming zone of the reactor. The resulting stream then enters the reaction zone whereupon there is injected the remainder of the oxidant required for the production of the desired carbon black in the present process. As mentioned earlier, the amount of oxidant introduced into the reaction zone will vary from an amount of from about 5 to about 45% of the total amount of oxidant required for producing the desired carbon black. Among the many oxidants suitable for use herein are included air, oxygen and blends of air with oxygen at various concentration levels. As a result of this improved process, the structure of the carbon blacks produced thereby is markedly reduced without significantly increasing the particle size of the blacks. Further, when the improved blacks are incorporated into rubber compositions, improved rubber physical properties are obtained. The process for carrying out this invention is described in greater detail hereinafter.

In the preparation of the hot combustion gases employed in preparing the blacks of the present invention, there are reacted in a suitable combustion chamber a liquid or gaseous fuel and a suitable oxidant stream such as air, oxygen, mixtures of air and oxygen or the like. Among the fuels suitable for use in reacting with the oxidant stream in the combustion chamber to generate the hot combustion gases are included any of the readily combustible gas, vapor or liquid streams such as hydrogen, carbon monoxide, methane, acetylene, alcohols, kerosene. It is generally preferred, however, to utilize fuels having a high content of carbon-containing components and, in particular, hydrocarbons. For example, streams rich in methane such as natural gas and modified or enriched natural gas are excellent fuels as well as other streams containing high amounts of hydrocarbons such as various hydrocarbon gases and liquids and refinery by-products including ethane, propane, butane, and pentane fractions, fuel oils and the like. Moreover, in the first stage of the modular furnace process it is preferred to use air as the oxidant and natural gas as the fuel in generating the primary combustion fire. As referred to herein, the primary combustion represents the amount of oxidant used in the first stage of the modular process relative to the amount of oxidant theoretically required for the complete combustion of the first stage hydrocarbon to form carbon dioxide and water. For purposes of convenience, the primary combustion is expected in terms of equivalence ratio. The equivalence ratio is defined as the ratio of the fuel supplied to that required for stoichiometric combustion of the available oxidant. The percent combustion may be calculated from the equivalence ratio by multiplying the reciprocal of the equivalence ratio by 100. In the present process, while the primary combustion may range from about 1.25 to about 0.33 equivalence ratio, or in other words, from about 80 to about 300% combustion, the preferred primary or first stage combustion ranges from about 0.83 to about 0.45 equivalence ratio, or from about 120 to about 220% combustion.

In this manner there is generated a stream of hot combustion gases flowing at a high linear velocity. It has furthermore been found that a pressure differential between the combustion chamber and the reaction chamber of at least 1.0 p.s.i., and preferably of about 1.5 to 10 p.s.i., is desirable. Under these conditions, there is produced a stream of gaseous combustion products possessing sufficient energy to convert a carbon black-yielding liquid hydrocarbonaceous feedstock to the desired carbon black products. The resultant combustion gas stream emanating from the primary combustion zone attains a temperature of at least about 2400° F, with the most preferable temperatures being at least above about 3000° F. The hot combustion gases are propelled in a downstream direction at a high linear velocity which is accelerated by introducing the combustion gases into an enclosed transition stage of smaller diameter which may, if desired, be tapered or restricted such as by means of a conventional venturi throat. It is at this point in the process, which is regarded as the second stage, where the feedstock is forcefully injected into the stream of hot combustion gases.

More particularly, in the second stage where the combustion gases are traveling at high velocity and there exists a gas kinetic head of at least above 1.0 p.s.i., a suitable liquid carbon black-yielding hydrocarbon feedstock is injected into the combustion gases, under sufficient pressure to achieve desired penetration, thereby insuring a high rate of mixing and shearing of the hot combustion gases and the liquid hydrocarbon feedstock. As a result of this environment, the liquid hydrocarbon feedstock is rapidly decomposed and converted to carbon black in high yields. Suitable for use herein as hydrocarbon feedstocks which are readily volatilizable under the conditions of the reaction are unsaturated hydrocarbons such as acetylene; olefins such as ethylene, propylene butylene; aromatics such as benzene, toluene and xylene; certain saturated hydrocarbons; and volatilized hydrocarbons such as kerosenes, naphthalenes, terpenes, ethylene tars, aromatic cycle stocks and the like. The liquid feedstock is injected substantially transversely from the outer or inner periphery, or both, of the stream of hot combustion gases in the form of a plurality of small coherent jets which penetrate well into the interior regions or core of the stream of combustion gases but not to a depth such that opposing jets would impinge. In practicing this invention, the hydrocarbon feedstock may readily be introduced as coherent streams of liquid by forcing the liquid feedstock through a plurality of orifices having a diameter ranging from 0.01 to 0.15 inch, and preferably ranging from 0.02 to 0.06 inch, under an injection pressure sufficient to achieve the desired penetration.

The amount of feedstock utilized herein will be adjusted in relation to the amounts of fuel and oxidant employed so that the present process for producing carbon blacks will have an overall equivalence ratio ranging from at least 6.67 to about 2.50, and preferably from about 5.00 to about 3.33 equivalence ratio. The overall equivalence ratio is defined as the ratio of the total hydrocarbon supplied to that required for stoichiometric combustion of the available oxidant.

The third stage of the modular process involves the provision of a reaction zone which will permit sufficient residence time for the carbon black forming reaction to occur prior to termination of the reaction by quenching. In general, although the residence time in each instance depends upon the particular conditions and the particular black desired, the residence times of the present process should be greater than 15 milliseconds. Accordingly, once the carbon black forming reaction has proceeded for the desired period of time, the reaction is terminated by spraying thereon a quench liquid, such as water, using at least one set of spray nozzles. The hot effluent gases containing the carbon black products suspended therein are then passed downstream where the steps of cooling, separating and collecting the carbon black are carried out in conventional manner. For example, the separation of the carbon black from the gas stream is readily accomplished by conventional means such as a precipitator, cyclone separator, bag filter, or combinations thereof.

It has now been found that the structure of the blacks prepared by the above-described modular process can be appreciably decreased so as to be useful for those applications requiring low structure blacks. In particular, the structure characteristics of the blacks are decreased by introducing oxidant in an amount of from about 5 to about 45% of the total oxidant required for producing the desired carbon black at a point in the process following the injection of liquid feedstock into the primary combustion fire. The oxidant is introduced downstream into the reaction zone tangentially, peripherally or longitudinally with tangential introduction being the preferred mode of operation. The oxidant introduced downstream may be introduced as such, or reacted with any suitable liquid or gaseous fuel and introduced in the form of hot combustion gases. It has been found for the present process that the amount of hydrocarbon and oxidant introduced downstream may have an equivalence ratio ranging from about 1.25 to about 0, with a preferred range of from about 0.46 0. Any of the oxidants or fuels suitable for use in preparing the primary combustion fire of the present process are equally suitable for use in preparing the secondary or downstream combustion gas stream when such is used. Moreover, the definition of the equivalence ratio of the secondary combustion gas stream is the same as that set forth for the primary fire with the obvious difference that now the ratio is determined on the basis of the oxidant used and required downstream. It has also been noted that, while it may be preferable, there is no necessity that the oxidant and/or fuel utilized herein be the same in the generation of both combustion gas streams. Furthermore, the equivalence ratio of the primary combustion gas stream may be the same as, or different from, the equivalence ratio of the secondary or downstream combustion gas stream. For example, if a fluid fuel is reacted with an oxidant, such as air, to generate the primary combustion fire, then it is possible to react natural gas with an oxidant to generate the combustion gases which are introduced into the reactor following the feedstock injection. In any event, the secondary combustion gases are introduced downstream at a location such that the structure of the resultant carbon blacks is markedly reduced without significantly increasing the particle size of the blacks.

The following testing procedures are used in evaluating the analytical and physical properties of the blacks produced by the present invention.

Iodine Adsorption Number

This is determined in accordance with ASTM D-1510-70.

Iodine Surface Area

The surface area of pelletized carbon black products is determined in accordance with the following iodine adsorption technique. In this procedure, a carbon black sample is placed into a porcelain crucible equipped with a loose-fitting cover to permit escape of gases and is devolatilized for a 7-minute period at a temperature of 1700° F in a muffle furnace and then allowed to cool. The top layer of calcined carbon black is discarded to a depth of one fourth inch and a portion of the remaining black is weighed. To this sample there is added a 100 milliliter portion of 0.01 N iodine solution and the resulting mixture is agitated for 30 minutes. A 50-milliliter aliquot of the mixture is then centrifuged until the solution is clear, following which 40 milliliters thereof is titrated, using a 1% soluble starch solution as an end point indicator, with 0.01 N sodium thiosulfate solution until the free iodine is adsorbed. The percent of iodine adsorbed is determined quantitatively by titrating a black sample. Finally, the iodine surface area expressed in square meters per gram is calculated in accordance with the formula [(Percent Iodine Adsorbed × 0.937) − 4.5]/Sample Weight = Iodine Surface Area.

This procedure for determining iodine surface area of carbon black pellets is designated as Cabot Test Procedure No. 23.1 for purposes of convenience inasmuch as there is still no official ASTM designation. As shown in a Cabot Corporation publication TG-70-1 entitled, "Industry Reference Black No. 3", by Messrs. Juengel and O'Brien published on Apr. 1, 1970, the iodine surface area of IRB No. 3 (Industry Reference Black No. 3) is 66.5 m$^2$/g as determined in accordance with Cabot Test Procedure 23.1 referred to hereinafter.

Pour Density of Pelleted Carbon Blacks

This is determined in accordance with ASTM D-1513 and reported as lbs/ft$^3$.

Dibutyl Phthalate Absorption Number of Carbon Black

This is determined in accordance with ASTM Test Method D-2414-72, as described earlier herein. The results reported indicate whether or not the black is in fluffy or pelleted form.

Tinting Strength

Tinting strength represents the relative covering power of a pelletized carbon black when incorporated in a 1 to 37.5 weight ratio with a standard zinc oxide (Florence Green Seal No. 8 made and sold by New Jersey Zinc Co.), dispersed in an epoxydized soybean oil type plasticizer (Paraplex G-62 made and sold by Rohm and Haas Co. ) and compared to a series of standard reference blacks tested under the same conditions. More particularly, the test involves mulling carbon black, zinc oxide, and plasticizer, in such proportions that the resulting ratio of carbon black to zinc oxide is 1 to 37.5. Reflectance measurements utilizing a Welch Densichron apparatus are then obtained from a film cast on a glass plate and readings are compared to carbon black standards having known tinting strengths. The tinting strengths of the carbon black standards are determined utilizing an arbitrarily assigned value of 100% for the tinting strength of the Cabot standard SRF carbon black. In this instance, as is conventionally done, the standard SRF carbon black arbitrarily assigned a value of 100% for tinting strength is Sterling S (Sterling is a registered trademark of Cabot Corporation) or Sterling R semi-reinforcing furnace black made by Cabot Corporation. Each of the Sterling R or Sterling S reference blacks is characterized by having, among other properties, a BET nitrogen surface area of about 23 m$^2$/g, an oil absorption of about 65 to 70 lbs. oil/100 lbs. black, and an average particle diameter of about 800 angstroms as determined by electron microscopy. The only difference is that Sterling R carbon black is in a fluffy form while the Sterling S carbon black is in pelleted form. Accordingly, the black selected for reference purposes then is determined by the state of the blacks to be measured for tinting strengths. The Sterling R or Sterling S semi-reinforcing carbon black is thus considered as the primary reference standard for determining tinting strengths of the other blacks.

Furthermore, as described above, additional carbon blacks are utilized as references for establishing tinting strength values covering the range of about 30% to about 250 percent. These are determined relative to the primary standard having the arbitrarily assigned value of 100% for tinting strength. In this manner, a series of blacks having a wide range of tinting strengths is made available so as to provide reference blacks that approximate as closely as possible the black to be measured. Exemplary carbon blacks employed as auxiliary tinting strength standards for purposes of the above procedure include the following blacks made by Cabot Corporation. The analyticals are determined in accordance with the test procedures set forth in the present application.

| Analytical Properties | Sterling MT (Medium Thermal) | Sterling FT (Fine Thermal) | Vulcan 6H | Vulcan 9 |
|---|---|---|---|---|
| Tinting Strength, % | 31 | 56 | 220 | 252 |
| Iodine Surface Area, m$^2$/g | 5.0 | 8.4 | 110 | 119 |
| DBP Absorption, cc/100 g | 33.6 | 35.9 | 131 | 117 |

For purposes of reference, the tinting strength of IRB No. 3 as determined in accordance with the above procedure is 208% of the primary Sterling S semi-reinforcing black. This is shown in a Cabot Corporation publication, TG-70-1 entitled, "Industry Reference Black No. 3" by Messrs. Juengel and O'Brien published on Apr. 1, 1970.

Modulus and Tensile

These physical properties are determined in accordance with the procedures described in ASTM Test Method D-412. In brief, the modulus measurement relates to the pounds per square inch pull observed when a sample of vulcanized rubber is stretched to 300% of its original length. The tensile measurement is a determination of the number of pounds per square inch pull required to rupture or break a sample of vulcanized rubber in a tension test.

The invention will be more readily understood by reference to the following examples which describe the detailed preparation of representative compounds. There are, of course, many other forms of this invention which will become obvious to one skilled in the art, once the invention has been fully disclosed, and it will accordingly be recognized that these examples are given for the purpose of illustration only, and are not to be construed as limiting the scope of this invention in any way.

EXAMPLE 1

In this example there is employed a suitable reaction apparatus provided with means for supplying combustion gas-producing reactants, i.e., a fuel and an oxidant, either as separate streams or as precombusted gaseous reaction products to the primary combustion zone, and also means for supplying both the carbon black-yielding hydrocarbonaceous feedstock and the combustion gases to be introduced downstream to the apparatus. The apparatus may be constructed of any suitable material such as metal and either provided with refractory insulation or surrounded by cooling means such as a recirculating liquid which is preferably water. Additionally, the reaction apparatus is equipped with temperature and pressure recording means, means for quenching the carbon black-forming reaction such as spray nozzles, means for cooling the carbon black product and means for separating and recovering the carbon black from other undesired by-products. Accordingly, in carrying out the present process, the following procedure is employed. In order to obtain the desired first stage combustion fire, in this instance 141%, or in other words, 0.71 equivalence ratio, there are charged into a combustion zone of the apparatus through one or more inlets air preheated to 700° F at a rate of 75.0 m.s.c.f.h. and natural gas at a rate of 5.67 m.s.c.f.h. thereby generating a stream of combustion gases flowing in a downstream direction at a high linear velocity. The rapidly flowing stream of combustion gases is passed into a second or transition zone which is of smaller cross-sectional diameter in order to increase the linear velocity of the stream of combustion gases. There is then introduced substantially transversely into the resultant stream of hot combustion gases liquid feedstock through four inlets each of which has a size of 0.055 inch located peripherally to the stream of combustion gases at a rate of 172.1 gallons per hour and under a pressure of 96 p.s.i.g. The feedstock utilized herein (and throughout all the other examples) is Sunray DX which is a fuel having a carbon content of 90.1% by weight, a hydrogen content of 7.96% by weight, a sulfur content of 1.4% by weight, a hydrogen to carbon ratio of 1.05, a B.M.C.I. Correlation Index of 128, a specific gravity in accordance with ASTM D-287 of 1.08, an API gravity in accordance with ASTM D-287 of −0.7, an SSU viscosity (ASTM D-88) at 130° F of 179, an SSU viscosity (ASTM D-88) at 210° F of 46 and an asphaltenes content of 1.9 percent. The reaction is carried out such that the overall combustion of the process is 23.3%, or 4.29 equivalence ratio, and the water quench for terminating the reaction is located at a point 35 feet downstream of the location of feedstock injection. The analyticals and performance characteristics of this black are reported in Table I. Moreover, this black is utilized herein as a control for Examples Nos. 2 and 3 since the entire amount of oxidant was added in forming the primary combustion fire.

EXAMPLE 2

Following the procedure of Example 1, there are charged to the primary combustion zone preheated air at a rate of 67.9 m.s.c.f.h. and natural gas at a rate of 5.03 m.s.c.f.h. to produce the desired first stage combustion fire of 142%, or 0.70 equivalence ratio. The liquid feedstock is then introduced at a rate of 170.7 gallons per hour and under a pressure of 129 p.s.i.g. through four orifices each of which has a diameter of 0.052 inch. In this example, however, at a location shortly downstream of the feedstock injection air is introduced tangentially into the reaction zone at a rate of 7.1 m.s.c.f.h. which is 9.4% of the total air required for producing the desired blacks. The air is reacted with natural gas, introduced at a rate of 0.5 m.s.c.f.h. so that the percent combustion of the downstream addition is 141%, or 0.71 equivalence ratio, essentially the same as the percent combustion of the primary fire. The reaction is carried out at an overall percent combustion of 23.5%, or 4.26 equivalence ratio, and the reaction is quenched with water at a point 35 feet downstream from the point of make injection. The analyticals and physical properties of the blacks are reported in Table I.

TABLE I

| Example No. | 1 | 2 |
|---|---|---|
| Iodine No. | 42 | 38 |
| Iodine Surface Area, m²/g | 29 | 27 |
| Tinting Strength, % SRF | 109 | 104 |
| DBP Absorption cc/100g on Pellets | 135 | 126 |

The suitability of the blacks of the present invention as reinforcing agents for rubber compositions is clearly shown by the following examples. In carrying out the examples, the rubber compositions are readily prepared by conventional methods. For example, the rubber and the carbon black reinforcing agent are intimately admixed together on a conventional mixing machine of the type normally used for mixing rubber or plastics such as a Banbury mixer and/or roll mill in order to insure satisfactory dispersion. The rubber compositions are compounded according to standard industry formulations for both a natural rubber and synthetic rubber-containing formulation. The resulting vulcanizates to be treated are cured at 293° F for 15 and 30 minutes when natural rubber is used and for 35 and 50 minutes when a synthetic rubber, styrene-butadiene in this instance, is employed. In evaluating the performance of the carbon blacks of the present invention, the following formulations are utilized wherein the quantities are specified in parts by weight.

| Ingredient | Natural Rubber Recipe | | Synthetic Rubber Recipe | |
|---|---|---|---|---|
| Polymer | 100 | (natural rubber) | 100 | (styrene-butadiene) |
| Zinc oxide | 5 | | 3.0 | |
| Sulfur | 2.5 | | 1.75 | |
| Stearic acid | 3 | | 1.0 | |
| Altax (MBTS) | 0.6 | | — | |
| N-tart-butyl-2-benzothiazole-sulphenamide | — | | 1.0 | |
| Carbon black | 50 | | 50 | |

| PHYSICAL PROPERTIES* | | |
|---|---|---|
| Example No. | 1 | 2 |
| In Natural Rubber | | |
| 300% Modulus, p.s.i. 15 minutes | +150 | +50 |
| 300% Modulus, p.s.i. 30 minutes | +40 | −40 |
| Tensile, p.s.i. 30 minutes | −630 | −500 |
| In Styrene-Butadiene | | |
| Extrusion Shrinkage, % | 90.4 | 91.2 |
| 300% Modulus, 35 minutes | −500 | −510 |
| 300% Modulus, 50 minutes | −400 | −500 |
| Elongation, 50 minutes | −20 | +10 |
| Tensile, 50 minutes | −1250 | −1200 |

*All of the above data is expressed relative to IRB No. 4 (Industry Reference Black No. 4)

The remaining examples are carried out in accordance with Examples 1 and 2 with the exceptions noted in the following Table II.

TABLE II

| Example No. | 3 | 4 | 5 | 6 | 7 |
|---|---|---|---|---|---|
| Primary air, m.s.c.f.h. | 75 | 52.5 | 75 | 60 | 52.5 |
| Primary nat. gas, m.s.c.f.h. | 5.67 | 3.95 | 3.97 | 3.16 | 2.76 |
| Primary combustion, equivalence ratio | 0.71 | 0.71 | 0.80 | 0.50 | 0.50 |
| Feedstock, g.p.h. | 152 | 149.3 | 154.3 | 158.5 | 148.2 |
| Feedstock, p.s.i.g. | 145 | 165 | 145 | 118 | 100 |
| Orifice size, inch | .055 | .047 | .055 | .052 | .052 |
| Downstream air, m.s.c.f.h. | — | 22.5 | — | 15 | 22.5 |
| Downstream nat. gas, m.s.c.f.h. | — | 1.18 | — | 1.13 | 1.69 |
| Downstream combustion, equivalence ratio | — | 0.71 | — | 0.71 | 0.71 |
| Downstream oxidant, % | — | 30 | — | 20 | 30 |
| Overall combustion, equivalence ratio | 3.89 | 3.85 | 3.73 | 3.83 | 3.63 |
| Quench, feet | 35 | 35 | 35 | 35 | 35 |

The analyticals of the above blacks and evaluation of the physical properties in natural and synthetic rubber formulations are given in the following Table III.

TABLE III

ANALYTICALS AND PHYSICAL PROPERTIES* OF BLACKS OF EXAMPLES 3–7

| Example No. | 3 | 4 | 5 | 6 | 7 |
|---|---|---|---|---|---|
| Iodine No. | 32 | 39 | 34 | 39 | 38 |
| Iodine Surface Area, m²/g | 25.8 | 30 | 24.2 | 27.9 | 29.5 |
| Tinting strength, % SRF | 96 | 115 | 98 | 122 | 119 |
| DBP Absorption, cc/100g on pellets | 144 | 86 | 114 | 90 | 86 |
| In Natural Rubber | | | | | |
| 300% Modulus, 15 minutes | +85 | −200 | +40 | −110 | −150 |
| 300% Modulus, 30 minutes | −75 | −390 | −100 | −170 | −240 |
| Tensile, p.s.i., 30 minutes | −800 | −600 | −650 | −310 | −410 |
| In Styrene-Butadiene | | | | | |
| Extrusion Shrinkage, % | 88.6 | 97.4 | 92.0 | 96.6 | 97.1 |
| 300% Modulus, 35 minutes | −610 | −1010 | −750 | −730 | −840 |
| 300% Modulus, 50 minutes | −460 | −950 | −670 | −730 | −820 |
| Elongation, 50 minutes | −5 | +140 | +20 | +80 | +60 |
| Tensile, 50 minutes | −1460 | −1110 | −1450 | −920 | −1310 |

*All of the above rubber data is expressed relative to IRB No. 4.

In reviewing the above data, it is intended that Example 1 be compared with Example 2; Example 3 with 4; and Example 5 with 6 and 7. The purpose of so doing is to permit one to most accurately observe the effects of the present process. The most striking feature of the present invention is that a process is now available for lowering the structure characteristics of a carbon black without increasing the particle size of the black. Indeed, if the present invention exhibits any trend, it would seem that the particle size of the blacks, if altered at all, is decreased. This is reflected by an overall assessment of the analytical properties of the blacks produced herein compared to blacks similarly produced but without use of the present improvement.

It will be seen from the above data that, all other things being essentially the same, the use of downstream addition of a certain portion of the total oxidant required for production of a desired black in a manner as practiced in this invention will result in production of a black tending to exhibit the same or smaller particle size. This is represented by a combination of increase in the properties of iodine surface area, tint and iodine number. The reduction in structure characteristics is shown not only by the noticeable reduction in DBP levels but also by the increased extrusion shrinkage values of styrene-butadiene rubber formulations wherein the blacks are incorporated. In general, the process of this invention yields blacks which, in both natural and synthetic rubber, cause decreased modulus and increased tensile strength.

Furthermore, the present process greatly minimizes the problem arising on occasion with the commercial production of semi-reinforcing blacks, namely, the presence of coke balls. Another feature of the present process is increased yield and carbon efficiencies of from 6 to 12% as compared to the present conventional process for preparing the semi-reinforcing grades of blacks.

EXAMPLE 8

In this example there is shown a more preferred embodiment of the present invention. In this instance, the oxidant which is air is introduced downstream in its original form rather than first being reacted with a fuel to form combustion gases. While retaining the benefits associated with using oxidant in the form of combustion gases as shown in the earlier examples herein, the use of oxidant only in this process is not only a more simple technique but also is more economical. In carrying out this example a different hydrocarbon feedstock is employed, namely, an ethylene process tar referred to as Imperial steam cracker bottoms. The ethylene tar is a fuel having a carbon content of 91.2% by weight, a hydrogen content of 7.28% by weight, a sulfur content of 1.2% by weight, a hydrogen to carbon ratio of 0.95, a B.M.C.I. Correlation Index of 134, an API gravity in accordance with ASTM D-287 of $-3.6$, a specific gravity in accordance with ASTM D-287 of 1.11, an SSU viscosity (ASTM D-88) at 130° F of more than 1000, an SSU viscosity (ASTM D-88) at 210° F of 106 and an asphaltenes content of 19.5 percent.

The procedure of EXAMPLE 1 is followed herein and, in accordance therewith, there are charged to the primary combustion zone air preheated to 550° F at a rate of 262.9 m.s.c.f.h. and natural gas at a rate of 14.4 m.s.c.f.h. to produce the desired first stage combustion fire having an equivalence ratio of 0.52 (or 191% primary combustion). The ethylene process tar feedstock is then introduced at a rate of 827 gallons per hour and under a pressure of 175 p.s.i.g. through six orifices, four of which have a diameter of 0.101 inch and the remaining two having a diameter of 0.089 inch. At a point somewhat downstream of the feedstock injection, air preheated to 550° F is introduced tangentially into the reaction zone at a rate of 58.1 m.s.c.f.h. which is 18.1% of the total amount of air required for producing the desired blacks. Potassium chloride is added at an overall combustion of 4.44 equivalence ratio (or 22.5% combustion) and quenched with water at a point 43 feet downstream from the point of make injection. The black is produced in good yields and has an iodine number of 35; an iodine surface area of 28 m²/gm; a tint of 121%; and a DBP (on pellets) of 91 cc/100 gms.

If the process of this example had been run without the downstream addition of air, there would have been produced a carbon black having generally the same particle size but having also a much higher structure (DBP). Moreover, having obtained a black of higher structure, if one were to attempt to reduce the structure to an acceptable level by adding potassium chloride, then such a great amount of potassium chloride would have been required as to increase the tint to an unacceptable level.

In a similar manner, other oxidants including oxygen or oxygen-enriched air and the like may be successfully utilized in the process of this invention.

While this invention has been described with respect to certain embodiments, it is not so limited, and it should be understood that variations and modifications thereof may be made which are obvious to those skilled in the art without departing from the spirit or scope of the invention.

The embodiments of the invention in which an exclusive property or privilege is claimed are defined as follows:

1. A modular process for producing furnace carbon blacks having lowered structure characteristics as represented by lowered DBP values of the blacks and increased extrusion shrinkage values of rubber formulations containing said blacks without significantly increasing the particle size of the blacks which comprises (a) reacting a fuel and an oxidant in a first stage so as to provide a stream of combustion gases having a combustion ranging from about 1.25 to about 0.33 equivalence ratio and possessing sufficient energy to convert a carbon black-yielding liquid hydrocarbon feedstock to carbon black; (b) propelling the combustion gas stream in a downstream direction at a high linear velocity into a second stage where the liquid hydrocarbon make is injected in the form of a plurality of coherent jets into the gaseous stream substantially transversely from the periphery of the combustion gas stream and under sufficient pressure to achieve the degree of penetration required for proper shearing and mixing; (c) introducing the resultant gaseous reaction mixture in a downstream direction into a third zone, the reaction zone, wherein oxidant in an amount of from about 5 to about 45% of the total amount of oxidant required for production of the desired carbon black is injected together with an amount of hydrocarbon sufficient to achieve an equivalence ratio ranging from about 1.25 to 0; (d) terminating the reaction by quenching and recovering the carbon black, the overall combustion of the process ranging from at least 6.67 to about 2.50 equivalence ratio.

2. A process as defined in claim 1 wherein the combustion of the first stage, primary combustion gas stream ranges from about 0.83 to about 0.46 equivalence ratio.

3. A process as defined in claim 1 wherein the oxidant introduced downstream of feedstock injection is achieved in the absence of hydrocarbon so that the equivalence ratio is 0.

4. A process as defined in claim 1 wherein the amounts of oxidant and hydrocarbon introduced downstream of feedstock injection are such that the equivalence ratio ranges from about 0.46 to 0.

5. A process as defined in claim 1 wherein the overall combustion for the process ranges from about 6.67 to about 2.50 equivalence ratio.

6. A process as defined in claim 1 wherein the overall combustion for the process ranges from about 5.00 to about 3.33 equivalence ratio.

7. A process as defined in claim 1 wherein the equivalence ratio of the first stage combustion gases is substantially the same as the equivalence ratio of the combustion gases introduced downstream of the feedstock injection.

8. A process as defined in claim 1 wherein the oxidant is air.

9. A process as defined in claim 1 wherein the combustion gases are introduced tangentially downstream of the feedstock injection.

10. A process as defined in claim 1 wherein the fuel utilized in the preparation of the first stage combustion gases is a liquid hydrocarbon.

* * * * *